United States Patent

Schmitz et al.

[11] Patent Number: 4,588,105
[45] Date of Patent: May 13, 1986

[54] SEALING PLUG

[75] Inventors: Gunther Schmitz, Enkenbach-Alsenborn; Bodo Greulich, Kaiserslautern; Gerhard Kettenring, Schopp, all of Fed. Rep. of Germany

[73] Assignee: TRW United-Carr GmbH, Frankfurt, Fed. Rep. of Germany

[21] Appl. No.: 757,563

[22] Filed: Jul. 22, 1985

[30] Foreign Application Priority Data

Jul. 26, 1984 [DE] Fed. Rep. of Germany ....... 3427626

[51] Int. Cl.⁴ .............................................. B65D 41/00
[52] U.S. Cl. ................................... 220/359; 220/307; 220/308
[58] Field of Search ........ 220/359, 307, 308, DIG. 19

[56] References Cited

U.S. PATENT DOCUMENTS 4,290,536 9/1981 Morel ................................. 220/359
4,391,384 7/1983 Moore, III et al. ................. 220/359
4,534,088 8/1985 Ricke ................................. 220/307
4,560,083 12/1985 Danico ............................... 220/307

FOREIGN PATENT DOCUMENTS 823722 11/1959 United Kingdom .
1354973 5/1974 United Kingdom .
1390125 4/1975 United Kingdom .
1466563 3/1977 United Kingdom .
1468365 3/1977 United Kingdom .

Primary Examiner—George T. Hall
Attorney, Agent, or Firm—Fay, Sharpe, Fagan, Minnich & McKee

[57] ABSTRACT

This invention relates to a sealing plug for tight sealing an opening in a panel, specifically in a motor vehicle chasis, comprising a plastic body 1 made up of a head portion 2 and a heat sealable ring 3 which is joined mechanically and/or by chemical surface adhesion and that the heat sealable ring 3 upon heated to a temperature in the range of from 85° C. to 180° C. causes the sealing ring to be firmly bonded and fixed to the vehicle panel.

12 Claims, 11 Drawing Figures

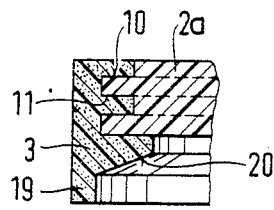
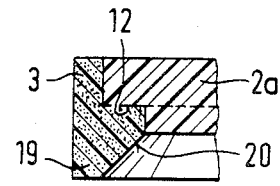
Fig. 4   Fig. 5
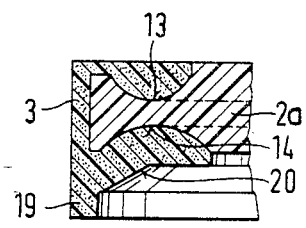
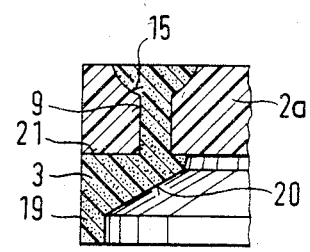
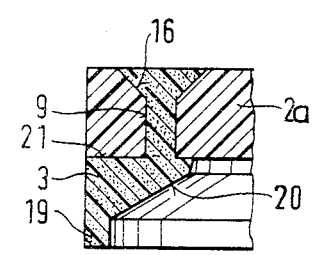
Fig. 6   Fig. 7   Fig. 8
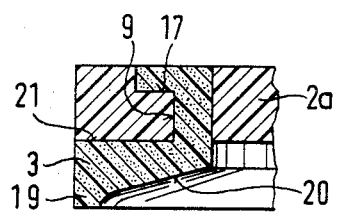
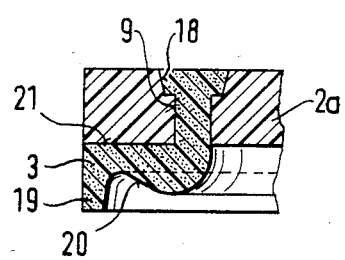
Fig. 9   Fig. 10

SEALING PLUG

BACKGROUND OF THE INVENTION

This invention relates generally to a sealing plug for tightly closing an opening in a panel and more particularly relates to securing such sealing plug in a liquid tight manner to close openings in a vehicle chasis with a heat responsive seal ring.

According to the state of the art, sealing plugs for tightly closing openings in vehicle panels is known such as disclosed in Great Britain patent specification No. 1,354,973. Typically such prior sealing plugs are of a resilient construction having a circumferential flange about which is placed the heat responsive ring. The ring is held in place on the flange by a circumferentially extending shoulder. Placement of the plug within the panel opening to be sealed is achieved by applying pressure which, because of its resiliency, causes the sealing plug to flatten so that the heat responsive ring is positioned parallel between the flange and the panel. Such known constructions have proven inadequate for several reasons. One deficiency in such construction is the resulting incomplete seal between the heat responsive ring and the sealing plug. The handling of the two-piece plug proves to be time consuming and expensive in terms of installing such two-piece plug into the opening.

SUMMARY OF THE INVENTION

The subject of the present invention provides a sealing plug comprising a head portion having a larger circumferential dimension than the opening in the vehicle panel which is to be closed and a skirt portion extending axially from the head portion. The circumferential dimension of the skirt is adapted to just fit inside the opening to be closed so as to provide a flange on the head portion that overlaps the circumference of the opening.

The head portion has a series of axially extending, circumferentially spaced, resilient guide elements, the outer free ends of which have radially emerging surfaces and inner ends spaced outwardly of the head portion forming a shoulder so that the sealing plug can be snapped into the opening. The sealing plug is equipped with a heat responsive annular plastic ring ("HRPR") with integrally formed lugs that fittingly engage into openings in the head portion. When the sealing plug is in place and subjected to heat in the range of 85° C. to 180° C. the HRPR melts filling the apertures and flowing between the head portion and the vehicle panel so as to adhesively secure the sealing plug to the panel and forming a liquid type seal between the plug and the vehicle panel.

The deficiency of the prior art sealing plugs is overcome in the present invention in that the sealing plug and the HRPR are mechanically and/or by chemical surface adhesion secured one to the other and the material of the HRPR functions as an adhesive bonding the heat sealable plug to the vehicle panel when heated to temperatures in the range of 85° C. and 180° C. This has the advantage that prior to installing the two component sealing plug into the opening into the vehicle panel the two elements are held closely together to greatly facilitate installing the sealing plug into the opening. Moreover, following the placement of the plug into the opening it is effectively tightly sealed upon exposure to heat. The ease and facility with which a sealing plug is installed in an opening is particularly important for motor vehicle technology. During the processing of automobile bodies any such openings in the vehicle bodies must be tightly closed during the manufacturing processes. The closure of such openings must be effected quickly, without taking a great deal of time and still meet the requirement of a liquid tight closure between the sealing plug and the opening.

Another feature of the construction of the sealing plug of this invention is the use of at least three guide elements, which extend axially from the head portion and positioned circumferentially on the underside of the head portion at spaced intervals. The circumferential arrangement of the three guide elements is such that they just fittingly engage into the opening of the vehicle panel. It will be appreciated that the guide elements by virtue of their circumferential location on the underside of the head portion causes the sealing plug to be self-centered in the opening and because of their resilience and configuration hold the plug in place during installation so that the plug does not fall out of the opening in the circumstance the panel is in a vertical position. In addition to the guide elements there is provided separate skirt portions which extend axially from the underside of the head portion. The rigid skirt portions are of the same circumferential dimension as the guide elements and having a greater height at the part of the skirt adjacent the guide elements. It is through this interaction between the guide elements and the skirt portions, that the risk of injury during installation of the sealing plug of this invention is beneficially prevented. In such instances, the skirt portions can have a flat design so that there will be a savings in material.

The unique mechanical connection between the sealing plug and the HRPR is achieved by forming suitable openings in the flange of the head portion which are adapted to receive corresponding shaped lugs integrally formed on the HRPR. Such openings may be holes, conical depressions, spherical depressions, blind holes, circumferential grooves, axis-parallel openings, and by undercuttings so that there results a secure mechanical connection between the sealing plug and the HRPR which is secured by pressing the integral lugs into the shaped openings. The HRPR is further constructed to accomodate irregularities in the vehicle body parts, particularly around the surface of the opening to be closed by having a tolerance equalizer. Said tolerance equalizer, once the HRPR melts, assures placement of the ring onto the surface of the panel.

To provide for the even flow of the molten material of the HRPR between the head portion of the sealing plug and the vehicle panel the HRPR is formed with a specially shaped surface which is arched or inclined so that during installation it will flow evenly around the plug and form a tight connection.

The HRPR is formulated as a hot melt adhesive which consists of ethylene-vinylacetate-copolymer. The HRPR can be placed in a common plane with the sealing plug whereby the heat sealing plug construction after installation is quite flat. Such flat arrangement is desirable because no bulges or raised surfaces result where dirty water might seep in or collect and in addition avoid the undesirable wear of carpeting in the circumstance the sealing plug is used in the foot area of the motor vehicle.

It is therefore the general object of the present invention to provide a sealing plug equipped with a HRPR that may be quickly and conveniently assembled prior to installation and can be handled as a unitary structure so that it is quickly installed into the opening of a vehicle panel and is adhesively bonded to the vehicle panel forming a liguid tight seal through the melting of the HRPR.

BRIEF DESCRIPTION OF THE DRAWINGS

FIGS. 4 to 10 are cross-sections of various shaped configurations of the HRPR for forming a mechanical connection between the sealing plug and the heat responsive plastic ring.

DESCRIPTION OF THE PREFERRED EMBODIMENT

Figure 1:
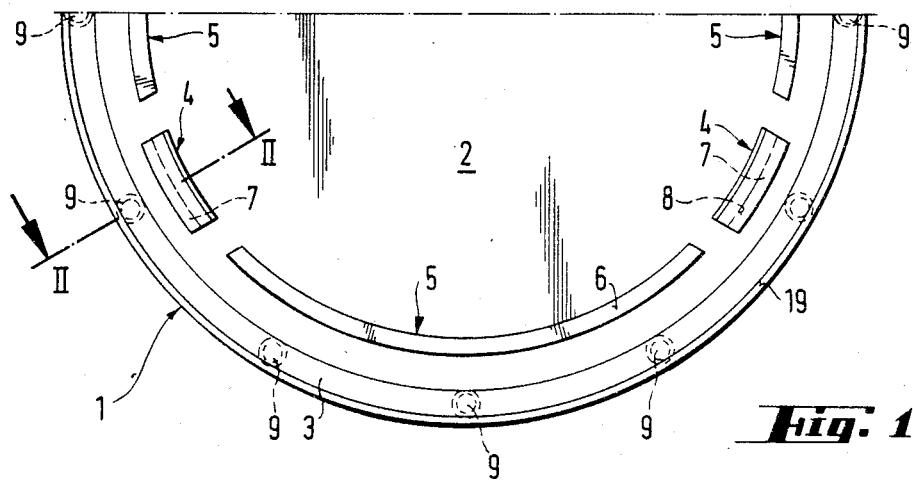
FIG. 1 is a plan view of a section of the underside of the sealing plug of this invention.

Referring to FIG. 1, there is shown the view of the underside of the sealing plug comprising the head portion 2, the heat responsive plastic ring 3, the guide elements 4 and the skirt portions 5.

Figure 2:
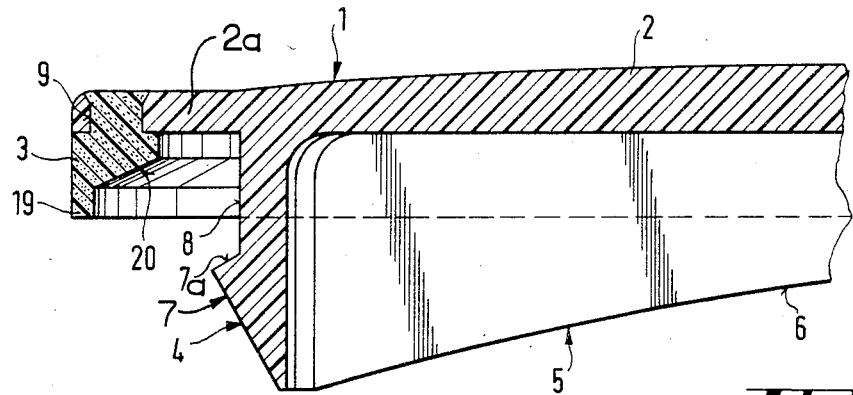
FIG. 2 is a sectional view of the sealing plug taken along the line II—II in FIG. 1.
Figure 3:
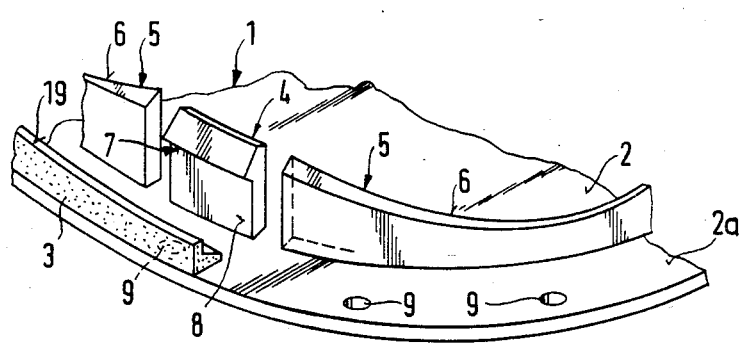
FIG. 3 is a perspective view of the underside of a portion of the sealing plug.

As shown in FIGS. 2 and 3 the HRPR 3 is mechanically connected to the head portion 2 at the flange 2a, for example, via drilled holes 9. The invention contemplates other ways of connecting the head portion 2 and the HRPR 3 through chemical surface adhesion. If the two afore-mentioned parts are made of different plastic materials, and are exposed to certain temperatures, the HRPR sticks to the under surface of the head portion at the flange 2a through chemical surface adhesion.

Figure 11:
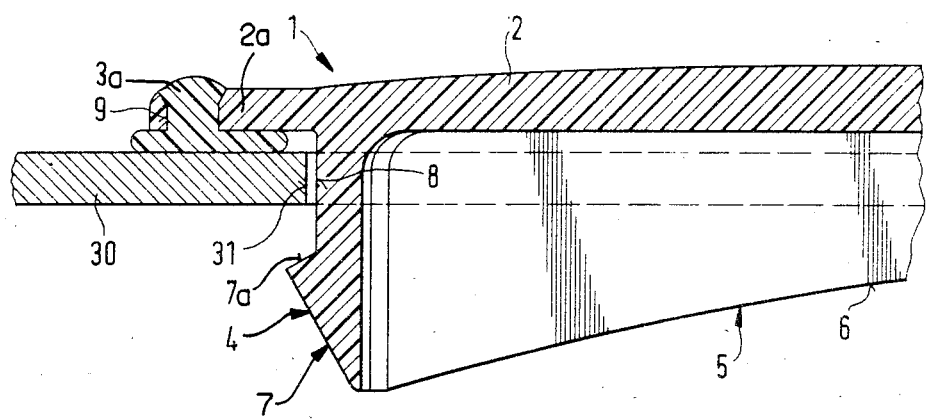
FIG. 11 is a cross-section of the sealing plug in place fastened to the vehicle panel.

Referring further to FIGS. 1, 2 and 3 it will be seen that the axially extending guide elements 4 have a circumferential dimension that is adapted to just fit inside the vehicle panel opening 31 (FIG. 11). The underside of the head portion 2 shows the axially extending guide elements 4 arranged in spaced-apart intervals along the circumference between the axially extending skirt portions 5. The circumferential dimension of the head portion 2 is larger than the circumferential dimension of the guide elements 4 and the skirt portions 5 so as to provide a flange 2a that overlaps the circumference the opening 31.

The guide elements 4 are formed of a resilient material and constructed so that the outer free ends have radially emerging surfaces and inner ends 7 spaced outwardly from the head portion forming a shoulder 7a and continues to form a guide surface 8. The inner end 7 and shoulder 7a assures that the sealing plug 1 can, for instance, be installed in a vertically positioned vehicle panel of an automobile and held in place by the hook-type areas of the guide elements that grab behind the vehicle panel. The guide surface 8 is designed in the form of a cylinder casing segment and produces excellent centering of the sealing plug 1 in the opening 31.

As shown in FIGS. 1 and 3 the skirt segments 5 are arranged between the guide elements 4. The skirt segments have the effect of shielding any sharp edges of the guide elements by extending above the height of the sharp edges thereby avoiding injury during installation of the sealing plug 1. It will be appreciated that the skirt segments 5 may be shaped and contoured so that the skirt height is lower where shielding is not required so as to result in the saving of material.

Referring again to FIGS. 2 and 3 head portion 2 has a number of holes 9 located around the flange 2a. The HRPR 3 is shown with integrally formed lugs 3a which are located at intervals around the HRPR coincident with the location of the holes 9 and the flange 2a. The lugs 3a are adapted to closely fit into the holes 9 so that upon pressing the HRPR 3 into position on the flange it is securely held on the sealing plug.

The HRPR is formulated as a hot-melt adhesive which consists of ethylene-vinyl-copolymer, and has a tolerance equalizer 19 whereby it is possible, in case of irregularities or warping of the surface around the panel opening, to effect a good fit vis-a-vis the surface of the vehicle panel. In addition, the HRPR 3 is contoured in the form of a arched or slanted surface 20 which serves as a melting aid to the melting or flowing of the HRPR 3. Upon heating the sealing plug, once it is in position in the opening, in the temperature range of 85° C. to 180° C., melting occurs and pressing on the ring will result in the entire area of the ring, due to the melting aid 20, to flow together in a manner that provides a tight seal between the sealing plug and the vehicle panel 30.

As a result of this connection, the sealing plate 1 is securely fastened to the vehicle panel 30, for example, to a motor vehicle chassis whereby no forces are being transmitted via guide elements 4 but the HRPR 3 alone produces the tight connection between the head portion 2 and the vehicle panel 30.

As shown in FIG. 2 the HRPR is provided with an annular rib 19 which functions as tolerance equalizer. Rib 19 of the HRPR 3 interacts with the guide surface 8 of the guide element 4 so that during preassembly of the heat sealing plug into the opening it can accommodate varying dimensional differences that may exist between the sealing plug, the vehicle panel surface and the opening.

Referring to FIGS. 4 through 10 there is shown the different forms of integral lug shapes and the corresponding receiving openings in the head portion 2 for making a suitable mechanical connection between these parts. FIG. 4 shows the receiving opening in the flange 2a as a circumferential recess 10 as well as a circumferential groove 11. Into these two recesses 10 and 11 appropriately shaped opposing elements of the HRPR 3 intervene and thus produce excellent mechanical connection between the head portion 2 and the heat sealable plastic ring 3.

In FIG. 5 the flange 2a exhibits a shoulder 12 at the underside into which an appropriately designed counterpart of HRPR 3 positions itself.

For the construction according to FIG. 6, two opposing convex depressions 13 and 14 are formed. They are located opposite each other in the region of the circumferential edge of the flange 2a into which the HRPR 3 positions itself.

Referring to FIGS. 7 and 8 there is shown holes which are drilled through the flange 2a and parallel to the axis of the sealing plug. They are located along the circumference of the flange 2a. The upper portions of each of the holes 9 in FIGS. 7 and 8 is countersunk in the form of a spherical funnel 15 and a conical funnel 16, respectively. Inasmuch as the HRPR 3 braces itself against the surfaces 21 on the underside of the flange 2a, there exists excellent mechanical connections between the sealing plug 1 and HRPR 3.

In FIG. 9 there is shown an undercut 17 in the upper region of the flange 2a. Each hole 9 is fitted with the same undercut 17. The area 21 in this instance results in a secure connection between the HRPR 3 and the flange 2a.

Each hole 9, as shown in FIG. 10 is cut with a cylindrical countersink 18 locking in the HRPR 3 against the surface area 21 of the flange 2a.

In each of the foregoing cases a proper connection is established between the flange 2a and the HRPR 3 of the sealing plug 1 according to this invention namely mechanically and/or through chemical surface treatment. The HRPR 3 with the tolerance equalizer rib 19 and the melting aid 20, seals the unique sealing plug 1 tightly, rapidly and functionally secure upon the application of heat and pressure. The guide elements 4 are needed only during the preassembly and it is the HRPR alone, once the heat is applied, that constitutes the connection between the flange 2a and the vehicle panel.

In FIG. 11 there is shown the completed installation of the sealing plug with the vehicle panel 30 according to the construction shown in FIG. 2 which has been heated to the temperature within the range of 85° C. to 180° C. Vehicle panel 30 has an openning into which are positioned the guide elements 4. Following the preassembly, the connection between the sealing plug 1 and the vehicle panel 30 is effected through fusion of the HRPR 3. Thereby, the areas 19 and 20, represented in FIG. 2 change their shape to the shape shown in FIG. 11.

What is claimed is:

1. In a sealing plug device adapted to seal an opening in a panel said plug comprising a head portion having a circumferential dimension larger than the circumference of the opening forming a flange that overlies the edge of said openings, an array of resilient guide means extending axially from said head portion and disposed in circumferentially spaced apart relation from one another and adapted to be fittingly engaged in said opening, the free end of said guide means equipped with shoulder portions for engaging one of the surfaces of said panel preventing removal of the sealing plug, a heat responsive plastic ring fittingly disposed on said head portion, the improvement comprising said flange portion formed with shaped receiving openings and said heat responsive plastic ring equipped with lug means adapted to be fittingly received into said receiving openings whereby the heat responsive ring is secured to said sealing plug.

2. The sealing plug as claimed in claim 1 wherein the heat responsive plastic ring is heated to a temperature in the range of 85° C. to 180° C. forming an adhesive bond between the flange portion and the panel forming a tight seal closing the opening.

3. The sealing plug as claimed in claim 1 wherein the head portion has a series of skirt elements extending axially from the underside and disposed circumferentially of the head portion on either side of the said guide means, said skirt elements having a greater axial dimension than the guide means so as to shield the guide means from contact.

4. The sealing plug as claimed in claim 1 wherein said array of guide means includes at least three elements.

5. The sealing plug as claimed in claim 1 wherein said skirt element have a flat configuration.

6. The sealing plug as claimed in claim 1 wherein said guide means includes guide surfaces for locating the sealing plug within the opening.

7. The sealing plug as claimed in claim 1 wherein the shaped receiving openings in the flange are through holes and the lug means are shaped and located on the heat responsive plastic ring to correspondingly be received in said holes.

8. The sealing plug as claimed in claim 1 wherein the shaped receiving openings in the flange are shaped depressions or cut-outs and the lug means on said heat responsive plastic rings are configured to be matingly engaged in said depressions or cut-outs.

9. The sealing plug as claimed in claim 1 wherein said heat responsive plastic ring is formed with an annular rib of material to equalize irregularities in the surfaces of the panel and sealing plug.

10. The sealing plug as claimed in claim 1 wherein inside circumferential surface of said heat responsive plastic ring is in the form of a concavity to aid in the flow control of the molten plastic.

11. The sealing plug as claimed in claim 1 wherein the heat responsive plastic ring is comprised of ethylene-vinyl-acetate-copolymer.

12. The sealing plug as claimed in claim 1 wherein said heat responsive plastic ring is reduced to an adhesive state at a temperature in the range of 85° C. to 180° C.

* * * * *